US008511347B2

(12) United States Patent
Schwartz

(10) Patent No.: US 8,511,347 B2
(45) Date of Patent: Aug. 20, 2013

(54) TAMPER-RESISTANT WATER FLOW RESTRICTION SYSTEM

(75) Inventor: David Schwartz, New Rochelle, NY (US)

(73) Assignee: D.S. Magic Tech LLC, Lynbrook, NY (US)

( * ) Notice: Subject to any disclaimer, the term of this patent is extended or adjusted under 35 U.S.C. 154(b) by 49 days.

(21) Appl. No.: 13/302,695

(22) Filed: Nov. 22, 2011

(65) Prior Publication Data

US 2012/0060939 A1 Mar. 15, 2012

Related U.S. Application Data

(63) Continuation of application No. 12/657,838, filed on Jan. 28, 2010, now Pat. No. 8,091,587.

(51) Int. Cl.
*F16D 1/04* (2006.01)

(52) U.S. Cl.
USPC ........... 138/44; 239/533.1; 239/553; 137/539

(58) Field of Classification Search
USPC .................. 138/44, 45; 239/533.1, 553, 562; 251/292, 95, 110; 137/385, 539
See application file for complete search history.

(56) References Cited

U.S. PATENT DOCUMENTS 2,454,929 A * 11/1948 Kempton ........................ 138/45
2,899,979 A * 8/1959 Dahl et al. ...................... 138/45
2,939,487 A * 6/1960 Fraser et al. .................... 138/45
3,537,482 A * 11/1970 Rudewick ....................... 138/44
3,642,031 A * 2/1972 Wright ........................... 138/45
3,707,161 A * 12/1972 Crawford ...................... 137/269
3,995,664 A * 12/1976 Nelson ............................ 138/43
4,133,350 A * 1/1979 Nelson ............................ 138/44
4,244,526 A * 1/1981 Arth .......................... 239/533.1
4,257,443 A * 3/1981 Turney ....................... 137/269.5
4,785,847 A * 11/1988 Steer et al. ................... 303/9.62
4,867,198 A * 9/1989 Faust ........................... 137/503
5,039,062 A * 8/1991 England et al. ................. 251/95
5,123,628 A * 6/1992 Yu ................................ 251/209
5,315,859 A * 5/1994 Schommer ..................... 73/1.25
5,404,904 A * 4/1995 Glaser ........................... 137/539
5,899,224 A * 5/1999 Moldenhauer ................ 137/517
5,937,909 A * 8/1999 Clauss et al. .................... 138/43

(Continued)

OTHER PUBLICATIONS

Neoperl, Inc. Neoperl Wholesale Price List Catalog 1, Copyright 2009.

(Continued)

*Primary Examiner* — Patrick F Brinson
(74) *Attorney, Agent, or Firm* — Gottlieb, Rachman & Reisman PC

(57) ABSTRACT

A system and method for installing and removing a flow restrictor assembly in a shower, while prevents tampering with the flow restriction system thus installed. Tampering is prevented by concealing the flow restrictor assembly behind a shower wall, attached directly to a water supply line. The system further prevents tampering by concealing the tool-hole necessary for its removal behind a flow restrictor disk, so that there are no visible means of removing the flow restrictor assembly. The flow restrictor assembly threads onto a showerhead arm and the flow restrictor assembly with the attached showerhead arm threads directly into the water line. When the showerhead arm is unthreaded, the flow restrictor assembly remains connected to the water line by an external screw thread. The flow restrictor must be removed to reveal the tool-hole which may only then be engaged by a tool for removal.

16 Claims, 9 Drawing Sheets

(56) References Cited

U.S. PATENT DOCUMENTS

| | | | | |
|---|---|---|---|---|
| 6,378,912 | B1 * | 4/2002 | Condon et al. | 285/220 |
| 6,390,134 | B1 * | 5/2002 | Hanby | 138/44 |
| D529,130 | S * | 9/2006 | Landolfi | D23/233 |
| 8,091,587 | B1 * | 1/2012 | Schwartz | 138/44 |
| 2002/0189679 | A1 * | 12/2002 | Avis et al. | 137/462 |
| 2004/0055364 | A1 * | 3/2004 | Brewer | 73/40.5 R |

OTHER PUBLICATIONS

Neoperl, Inc. Neoperl Wholesale Price List Catalog 2, Copyright 2011.

Neoperl, Inc., Neoperl Wholesale Price List, Catalog 3, USA, 2009.

* cited by examiner

TAMPER-RESISTANT WATER FLOW RESTRICTION SYSTEM

RELATED APPLICATION

This application is a continuation of application Ser. No. 12/657,838, filed on Jan. 28, 2010, now U.S. Pat. No. 8,091,587 now allowed, which is incorporated herein by reference.

BACKGROUND OF THE INVENTION

The invention relates generally to a system for restricting water flow by a tamper-resistant flow restrictor assembly. More particularly, the invention relates to a system and a method for installing and preventing tampering with a flow restrictor assembly for restricting water flow to a showerhead by concealing the method of removal of the flow restrictor assembly.

Headlines concerning global warning and potential weather extremes that may lead to drought in some areas has renewed interest in conserving water and energy. Showers are typically the third largest water use in a residence after toilets and clothes washers. It has been estimated that the average American shower uses 17.2 gallons when taking a shower that lasts for 8.2 minutes at the average flow rate of 2.1 gallons per minute(gpm). Reducing the use of heated hot water is one way to conserve both water and energy. Since 1994, through the Energy Policy Act of 1992, the Federal government has mandated that many household fixtures must reduce water flow. For example, all showerheads manufactured or imported into the United States must meet reduced flow requirements of 2.5 gpm at 80 pounds per square inch(psi). Prior to this regulation, shower users could consume five to eight gpm.

To meet the Federal goal, to conserve resources, and to save money, many flow restrictors have been installed in showers. These restrictors are simple disks with small orifices that can either be an integral part of a new showerhead or they can be "after-market" inserts that are installed at a point between the shower arm and the showerhead itself. Integral restrictors are used by the showerhead manufacturer to reduce the flow and meet the 2.5 gpm Federal maximum allowable flow rate. Because they typically are easily removed for cleaning, it gives the user the opportunity to increase the flow rate to a level that exceeds 2.5 gpm by simply eliminating the removable disk. This undesirable characteristic permits one to defeat the purpose of the Federal regulation. After-market flow restrictors are readily available that accomplish the task of reducing the showerhead flow to some more-efficient rate, below the Federal mandated rate of 2.5 gpm that results from a compliant showerhead. In many cases, though, the effect of the restrictor is to render the shower experience unsatisfactory because of the lower pressure and force. Generally, because an after-market restrictor is visible on the shower arm, the frustrated bather can easily remove it with the aid of a few simple tools.

Many apartment buildings do not have separate water meters for each tenant nor separate water heating systems for each individual apartment. As a result, the cost of the water as well as the cost of the heating the water is borne by the landlord who then will pass these costs back to the tenants through the rent. Often the landlord may not be permitted by law to raise the rent to compensate for rising utility costs because of rent control laws. Like homeowners, landlords desire to "go green" and operate more environmentally conscientious buildings by conserving water and heat in a manner that least inconveniences tenants. While the newer showerheads and after-market inserts have resulted in savings in both water and energy, these are easily defeated by a tenant with a few simple tools and minimum skill and knowledge. Landlords desire a system that reduces water use and is resistant to tampering.

One attempt to foil a tenant's attempt to remove an "after-market" external flow restrictor used a rotating sleeve to cover the set screw that locked the fitting in place on the showerhead arm. The rotating sleeve was held in place by an additional set screw. However, because the tenant easily could spot where the flow restrictor was placed, it invited attempts to be tampered with. Once the set screw on the outside of the rotating sleeve was removed, the sleeve freely rotated. Once the sleeve was rotated, the second set screw was easily removed and the flow restrictor unscrewed from the arm.

While these units may be suitable for the particular purpose employed, or for general use, they would not be as suitable for the purposes of the present invention as disclosed hereafter.

SUMMARY OF THE INVENTION

It is an object of the invention to produce a system for restricting water flow that prevents tampering by concealing a flow restrictor assembly. Accordingly, the flow restrictor assembly installs on a water line immediately before a showerhead arm and is hidden, behind a shower wall with a cover plate.

It is another object of the invention to produce a system for restricting water flow that prevents tampering by having a fitting seemingly free of any flat edge for engaging with a tool. Accordingly, the only visible surface of the flow restrictor assembly has a rounded surface free of a flat edge for a tool to grasp for removal.

It is yet another object of the invention to produce a system for restricting water flow that prevents tampering by concealing the mechanism of removing the flow restrictor assembly. Accordingly, the flow restrictor assembly has a fitting with a necessary tool-hole hidden behind a flow restrictor and an O-ring.

It is a further object of the invention to produce a method for installing and removing a flow restrictor assembly water flow that prevents tampering. Accordingly, the flow restrictor assembly installs by threading onto the showerhead arm and the flow restrictor assembly with the attached showerhead arm threads directly into the water line behind the shower wall of the shower, but the flow restrictor assembly does not detach when the showerhead arm is removed.

It is yet a further object of the invention to produce a method for installing and removing a flow restrictor assembly water flow that prevents tampering by concealing the mechanism of removal. Accordingly, to remove the flow thread-restrictor assembly, a knowledgeable worker must remove the flow restrictor disk and O-ring in a fitting to reach the concealed tool-hole in an end of the fitting threaded directly into the water line behind the wall.

The invention is system and method for installing and removing a flow restrictor assembly in a shower, while prevents tampering with the flow restriction system thus installed. Tampering is prevented by concealing the flow restrictor assembly behind a shower wall, attached directly to a water supply line. The system further prevents tampering by concealing the tool-hole necessary for its removal behind a flow restrictor disk, so that there are no visible means of removing the flow restrictor assembly. The flow restrictor assembly threads onto a showerhead arm and the flow restrictor assembly with the attached showerhead arm threads directly into the water line. When the showerhead arm is unthreaded, the flow restrictor assembly remains connected to the water line by an external screw thread. The flow restrictor must be removed to reveal the tool-hole which may only then be engaged by a tool for removal.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 6A:
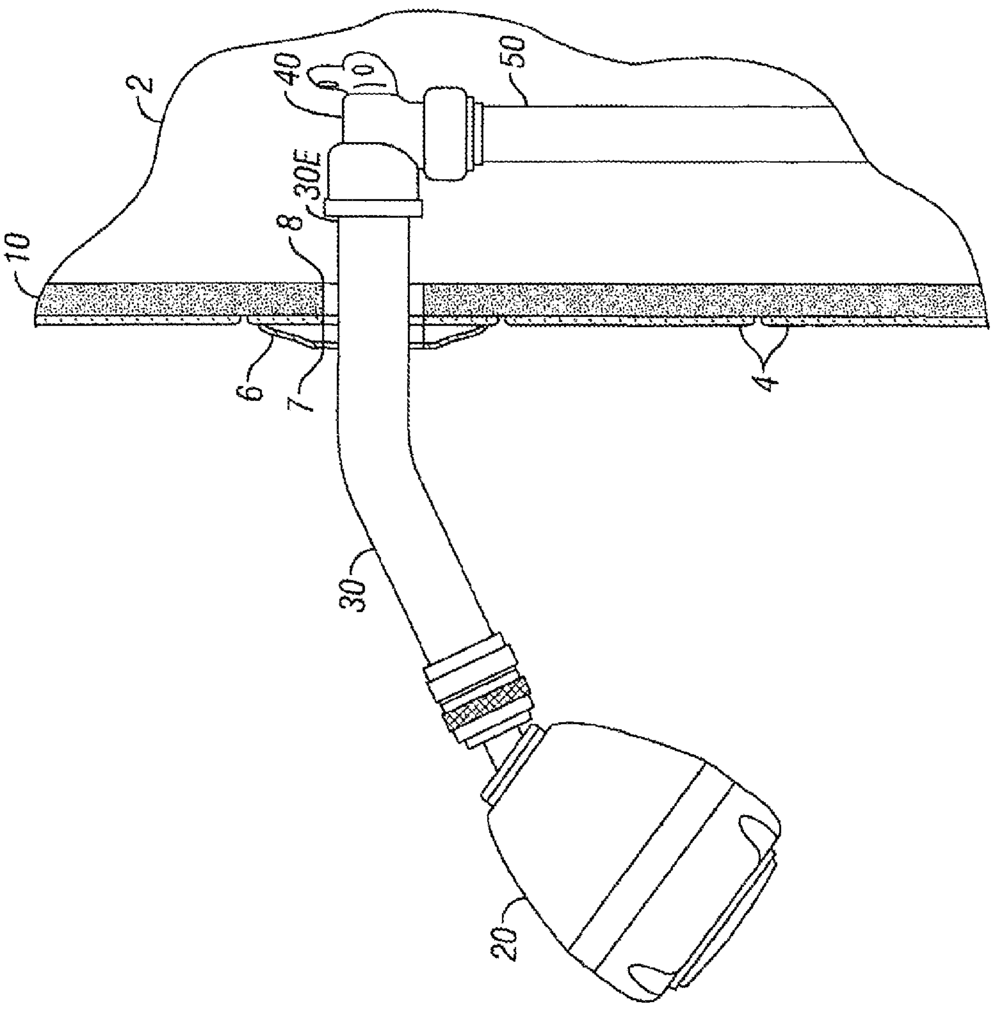
FIG. 6A is a side elevational view of a conventional showerhead installation with a a cross-sectional view of a shower wall.
Figure 6B:
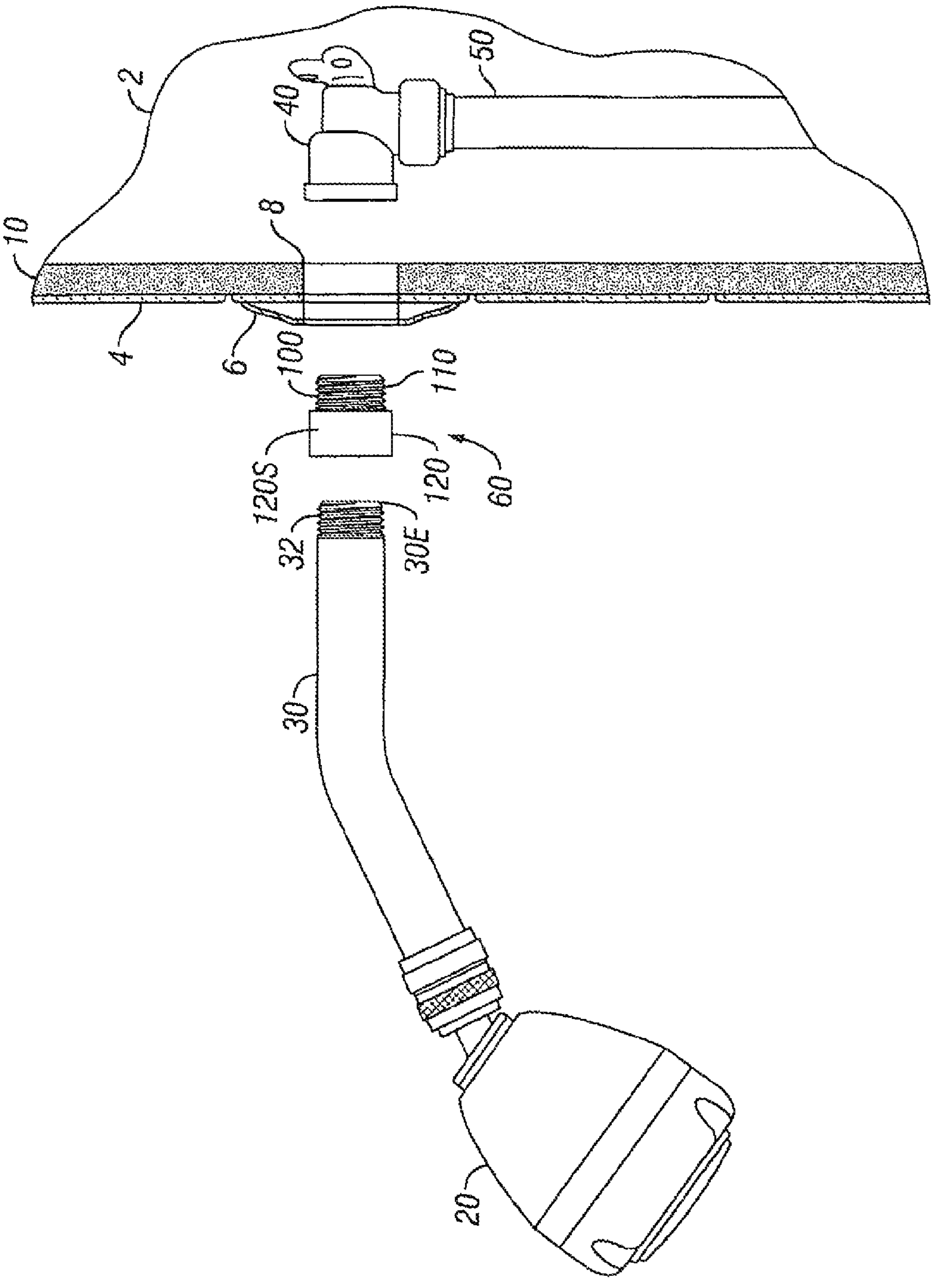
FIG. 6B is a side elevational view of the invention, showing a showerhead arm and the flow restrictor assembly prior to installation.
Figure 6C:
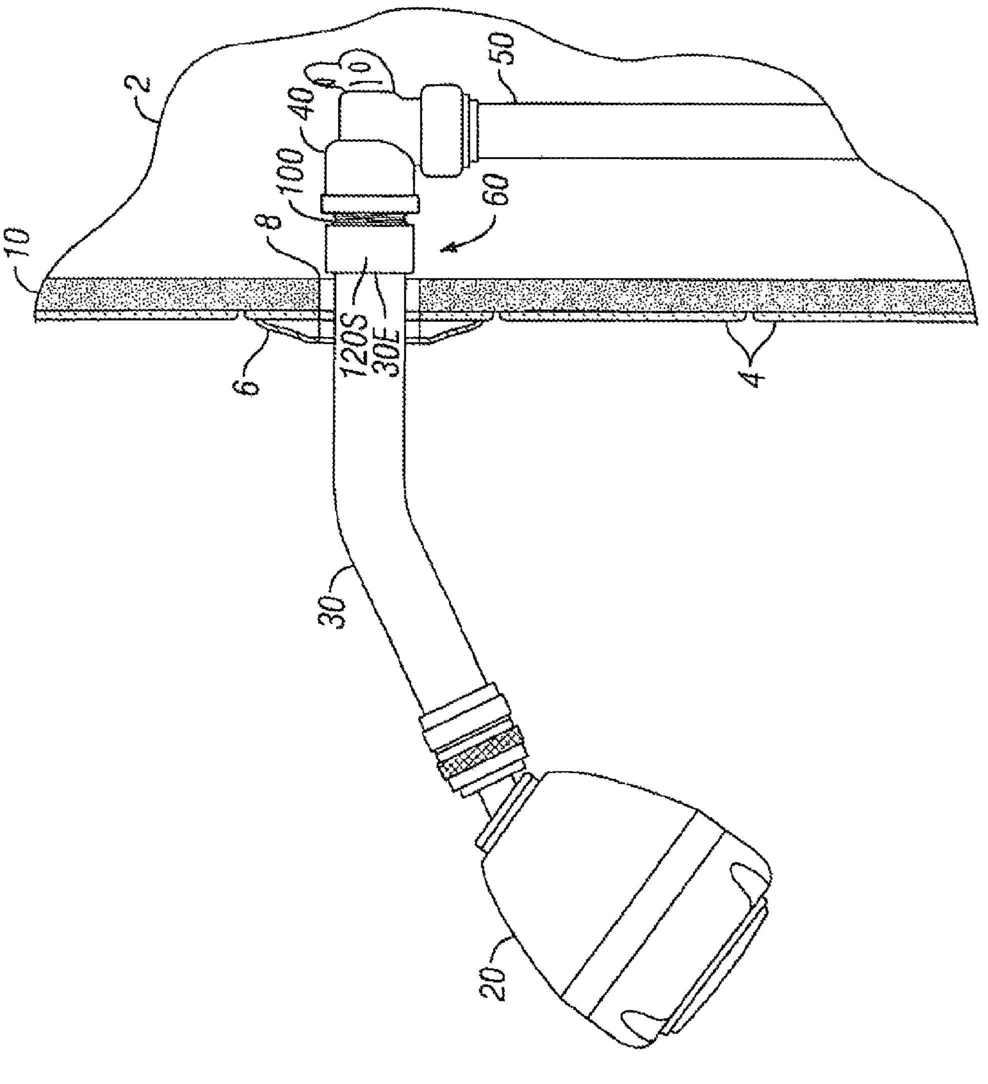
FIG. 6C is a side elevational view of the invention, similar to FIG. 6B, with the flow restrictor assembly installed.

FIG. 6C illustrates a tamper-resistant flow restriction system installed in a shower. The system includes a flow restrictor assembly 60 that connects a showerhead arm 30 coupled with a showerhead 20, to a water supply line 50. The flow restrictor assembly 60 is concealed behind a shower wall 10 such that it is not visible to a user during routine showering. If the user attempts to discover what is restricting water flow by removing the showerhead 20 and the showerhead arm 30, the user will, at best, see the flow restrictor assembly 60 behind the shower wall 10 but will not be able to see any mechanism to remove it. The flow restrictor assembly 60 has a tamper-resistant fitting 100 with a hidden top section explained hereinbelow. The fitting 100 has a bottom section with a visible outside surface 120S that is rounded to resist grasping and removal by common household tools. Disconnection and removal of the flow restrictor assembly 60 requires the knowledge of the hidden top section that has a hidden tool-hole in the tamper-resistant fitting 100, which will be described in further detail hereinafter.

Figure 5:
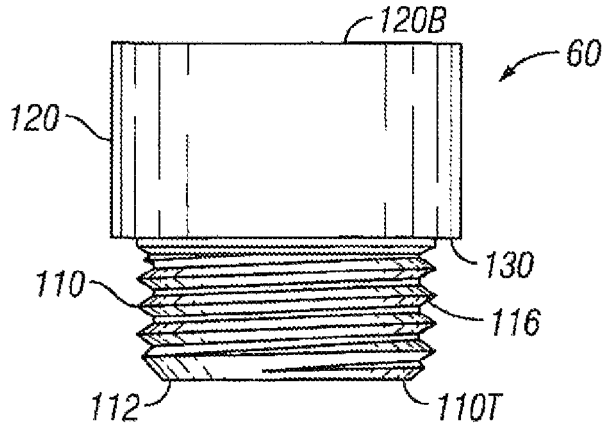
FIG. 5 is a side elevational inverted view of the flow restrictor fitting.

FIG. 5 shows the fitting 100. The fitting 100 is a one piece unit which has a top section 110, a bottom section 120, and an intersection of the two sections 130. The top section 110 of the fitting 100 has an outside surface with an exterior screw thread 116. The fitting 100 is substantially tubular in shape, having a continuous bore for carrying water through the top section 110 and bottom section 120.

Figure 1:
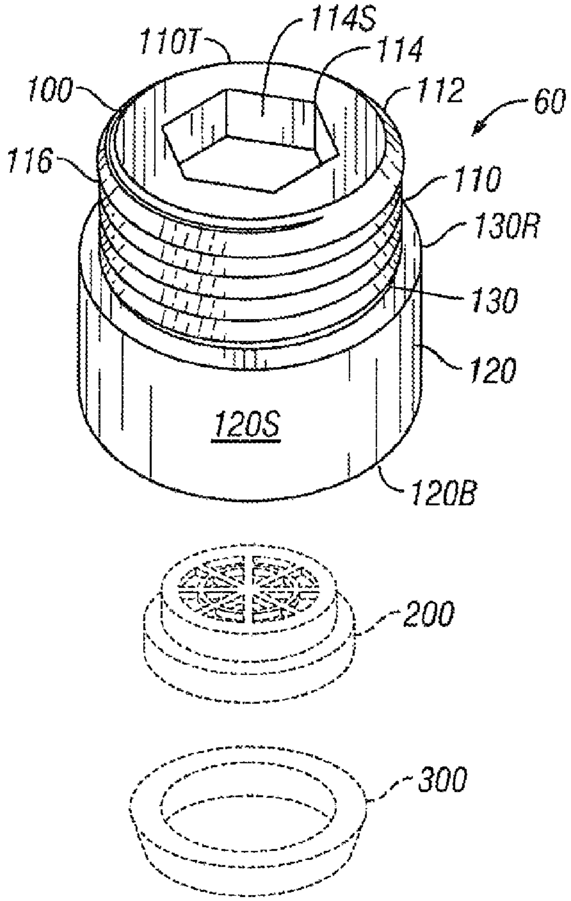
FIG. 1 is a diagrammatic perspective view from the top of a flow restrictor assembly with an exploded view of a flow restrictor disk and an O-ring separated from a fitting.

FIG. 1 shows the flow restrictor assembly 60 in an exploded view. The fitting 100 has a partially open first end 110T on the top section 110 and an open second end 120B on the bottom section.

The first end 110T has a flat plane 112 covering the opening with a tool-hole 114 in the middle of the flat plane 112 that only partially closes the first end 110T. For this discussion, a tool-hole is an aperture in a surface through which a tool may be placed to engage a mechanism or device. A flow restrictor disk 200 and an O-ring 300 are shown in the exploded view, which are plated inside the bottom section 120. The structure and composition of flow restrictors and O-rings are well known by those possessing ordinary skill in the field of the invention and are beyond the scope of this discussion. The purpose of the flow restrictor disk 200 is to either lower (restrict) or limit (regulate) flow of water between the first end 110T and second end 120B. Note although in the plumbing trade, the difference between flow restrictors and flow regulators may be significant, for the purposes of the present invention which has no bearing on such a distinction, the where "restrictor" is described, "regulator" would apply equally.

Figure 3:
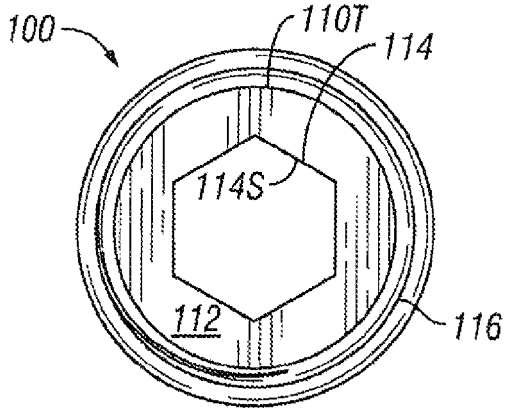
FIG. 3 is a top plan of the fitting.

FIG. 3 shows the flat plane 112 of the top section of the fitting 100 with the tool-hole 114. The shape of the tool-hole 114 is a polygon or other multi-sided shape having at least one flat side 114S. In one embodiment, the tool-hole is a hexagon. It is understood that numerous variations in the shape of the tool-hole are possible, while adhering to the inventive concept. While the fitting 100 must have an opening in the flat plane 112 to allow water to flow through the system, the position and shape of the opening of the tool-hole 114 determines the shape of the tool that must be used to remove the fitting 100.

Figure 4:
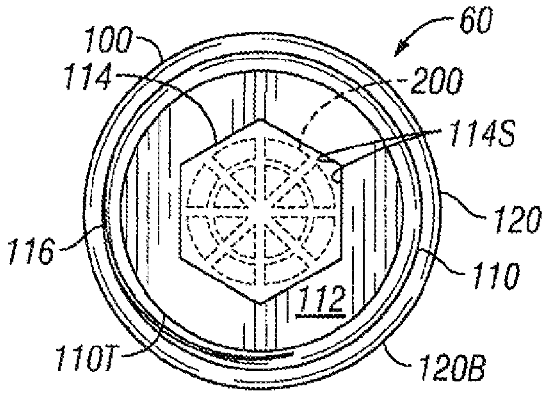
FIG. 4 is a top plan view of the flow restrictor fitting with the flow restrictor disk in place.

FIG. 4 shows the flow restrictor disk 200 in place inside the fitting 100 as seen from the first end 110T. Water flows through the tool-hole 114 from the water line and into the flow restrictor disk 200 seated at the intersection of the top section 110 and the bottom section 120 of the fitting 100. Note that when viewed from the second end 120B, only the flow restrictor disk 200 is visible.

Figure 2:
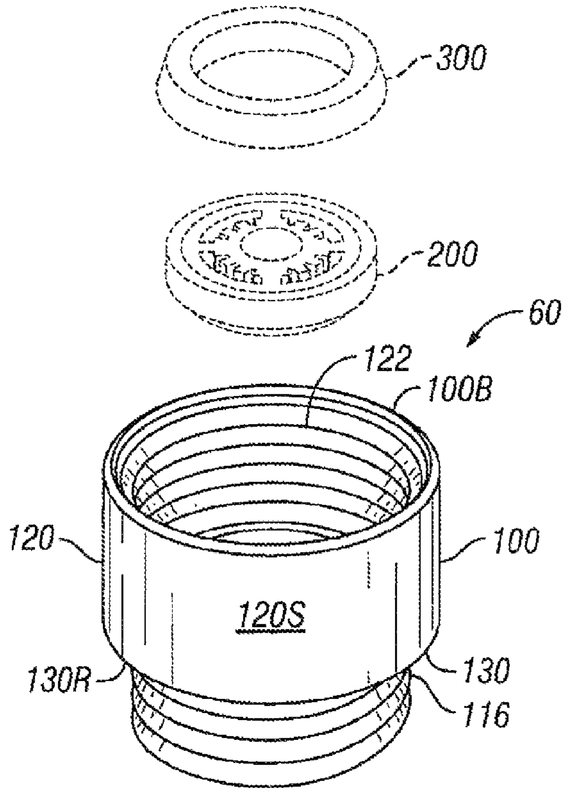
FIG. 2 is a diagrammatic perspective inverted view, similar to FIG. 1, from the bottom of the flow restrictor assembly.

FIG. 2 shows the flow restrictor assembly 60 in an inverted position. The bottom section 120 has an inside surface with an internal screw thread 122 and an outside surface 120S. The outside surface 120S is rounded and free of any flat surfaces. The second end 120B of the fitting 100 is open and available for threading onto the showerhead arm, by threading the showerhead arm into the screw thread 122.

The bottom section 120 with the internal screw thread 122 has a slightly larger diameter than the top section 110 with the external screw thread 116. At the intersection 130 of the top section 110 and bottom section 120 is a ridge 130R created by the difference in the inner diameters. The flow restrictor disk 200 is placed inside the bottom section 120 and sits on the ridge 130R at the intersection 130. The O-ring 300 is placed on top of the flow restrictor disk 200 to secure the flow restrictor disk in place next to the ridge 130R. When the fitting 100 is installed in the system as described hereinabove, the flow restrictor disk 200 and O-ring 300 hide the flat plane 112 and the tool-hole 114 from view when the showerhead arm is removed.

FIG. 6A shows a prior art example of how a showerhead arm is connected to a water line 50 without the flow restrictor assembly. Behind the shower wall 10 in a cavity 2 is the water line 50 with a fitting commonly called an elbow 40 that redirects the flow of water from an upward vertical direction to a horizontal direction. The elbow 40 has an internally threaded opening in the horizontal direction, which is accessible through a rough opening 8 in the shower wall 10. The showerhead arm 30 has a first end connected to the showerhead 20 and a second end 30E with an external thread 32. The second end 30E is inserted in the rough opening 8 of the shower wall 10. The external thread is threaded into the internal thread of the elbow 40 and is hand-tightened sufficiently to form a water tight connection. The second end of the showerhead 30E is concealed behind the cover plate 6 and the shower wall 10. The cover plate 6 does not have to be removed to connect or disconnect the showerhead arm 30 because the cover plate has an aperture 7 through which the showerhead arm 30 can extend. The second end 30E of the showerhead arm 30 is therefore routinely concealed when the cover plate 6 in place.

The uncomplicated method of installing the flow restrictor assembly 60 according to the present invention, begins in FIG. 6B, where the separate parts of the system are disconnected prior to installation. Once the showerhead arm 30 is removed from the elbow 40, the bottom section 120 of the fitting 100 is screwed onto the thread 32 at the second end 30E of the showerhead arm 30. Because the outside surface 120S of the bottom section 120 is rounded without a flat surface for a wrench or a similar tool to grasp, the fitting 100 is hand-tightened to form a connection.

Referring still to FIG. 6B, the showerhead arm 30 with the flow restrictor assembly 60 in place is then threaded into the elbow 40, the external thread 116 of the top section 110 of the fitting 100 screwing into the internal thread of the elbow 40. Because the elbow 40 is stationary inside the cavity 2 of the shower wall 10, the fitting 100 is hand-tightened sufficiently to form a water tight connection by rotating the showerhead. Over the opening in the wall is the cover plate 6 to prevent water from entering the cavity 2. When the showerhead arm 30 and the cover plate 6 are in place, the flow restrictor assembly 60 is invisible behind the shower wall 10.

Figure 6D:
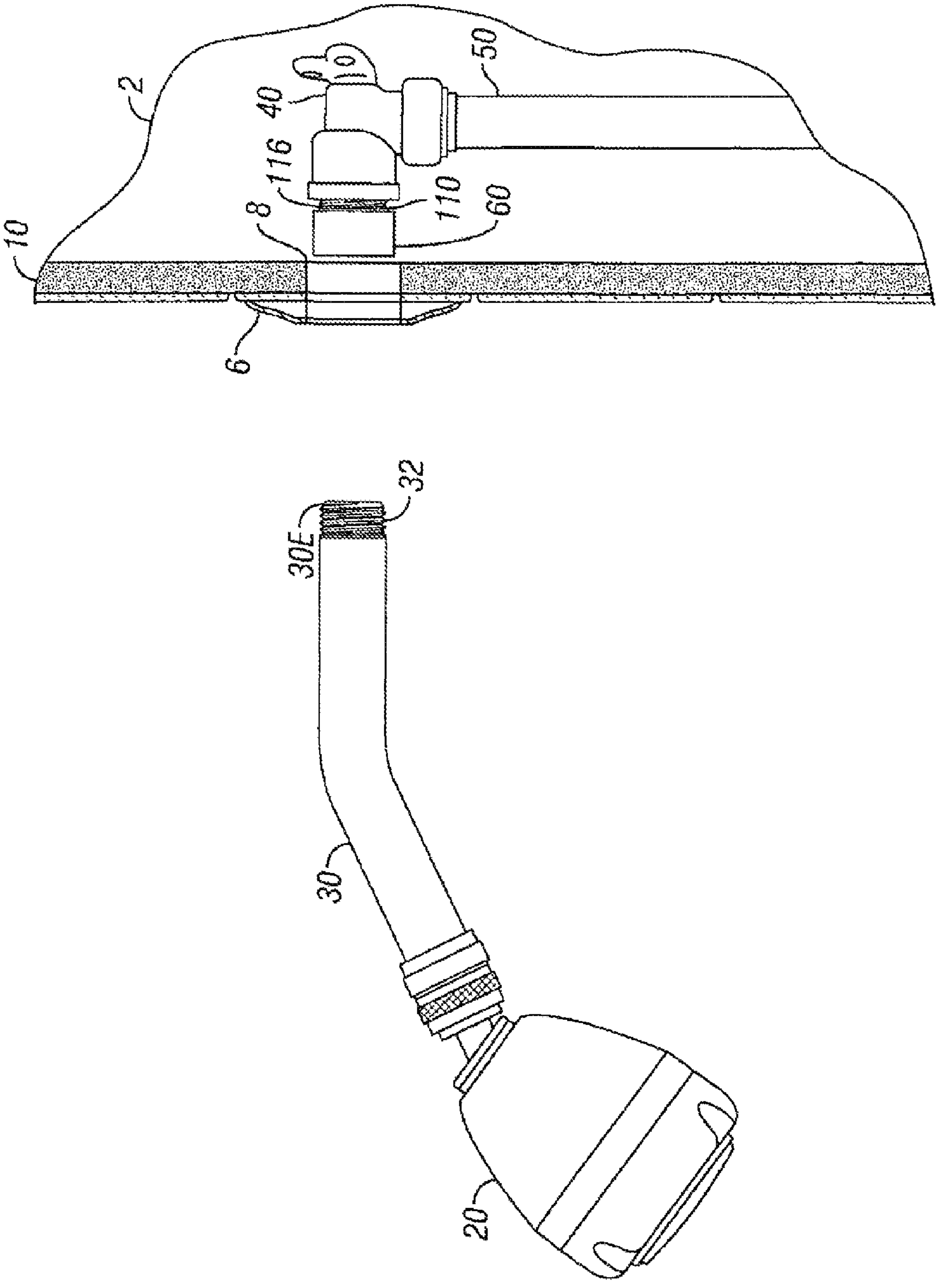
FIG. 6D is a side elevational view of an installation of the invention, similar to FIG. 6C, demonstrating the process of removing the shower arm without disconnecting the flow restrictor assembly from a water line.

FIG. 6D illustrates how the system works when the user attempts to remove the showerhead arm 30 to investigate what is restricting the water flaw. When the showerhead arm 30 is removed, the flow restrictor assembly 60 remains attached to the elbow 40.

Figure 7:
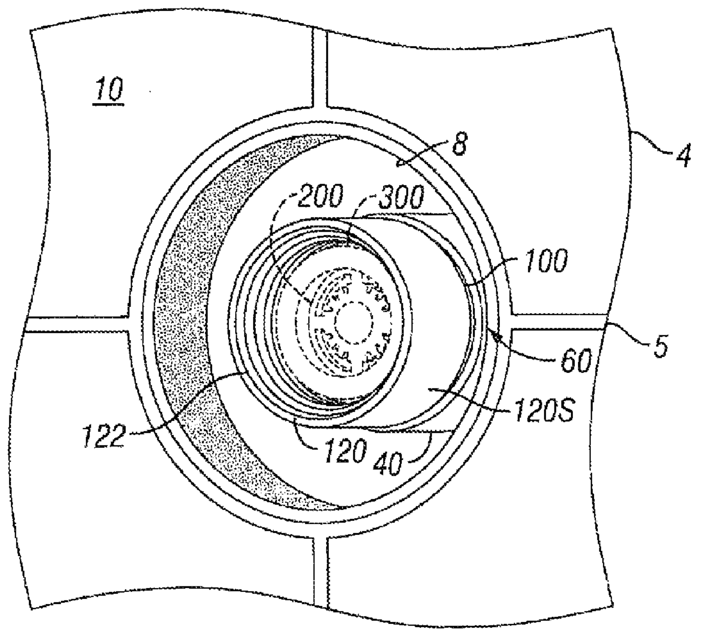
FIG. 7 is a diagrammatic perspective view of the front of the flow restrictor assembly in a showerhead concealed behind the wall with the showerhead and connecting arm removed.

FIG. 7 shows what is presented to the user after removing the showerhead arm and then the cover plate. It should be understood the rough opening 8 in the shower wall 10 is somewhat exaggerated in this and the following drawings for clarity to better demonstrate the invention. Typically, there is even less clearance between the rough opening 8 and the fitting. A plurality of tiles 4 with grout filling 5 would often surround the rough opening 8, and thus the opening 8 would be somewhat irregular as determined by the trimming skill of the tiler. Accordingly when the user removes the showerhead arm, the user sees the O-ring 300 and the flow restrictor disk 200 behind it in the bottom section 120 of the fitting 100. The user does not see the top section of the fitting 110 with the tool-hole on the flat plane. Also, the user will quickly realize that cannot easily place a grasping tool, such as, for example but not limited to, an open-end wrench or pliers, on the outside surface 120S of the bottom section 120 of the fitting 100 because there is no available flat surface to engage the grasping tool, and very little space to even get around the bottom section 120 of the fitting. Also, the user cannot easily place the grasping tool on the inside of the bottom section 120 of the fitting 100 because of the internal screw thread 122. Because the user cannot see a way to engage fitting 100 with known grasping tools, the user abandons the attempt to tamper with the flow restrictor assembly 60.

Figure 8:
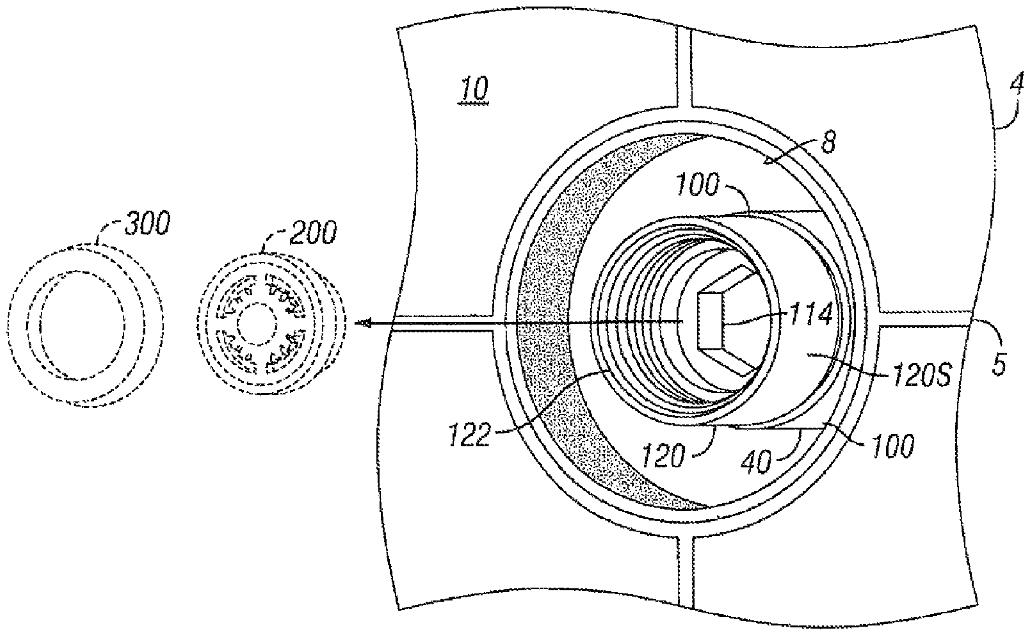
FIG. 8 is a diagrammatic perspective view of the front of the flow restrictor assembly, similar to FIG. 7, with the exploded view of the flow restrictor disk and the O-ring.
Figure 9:
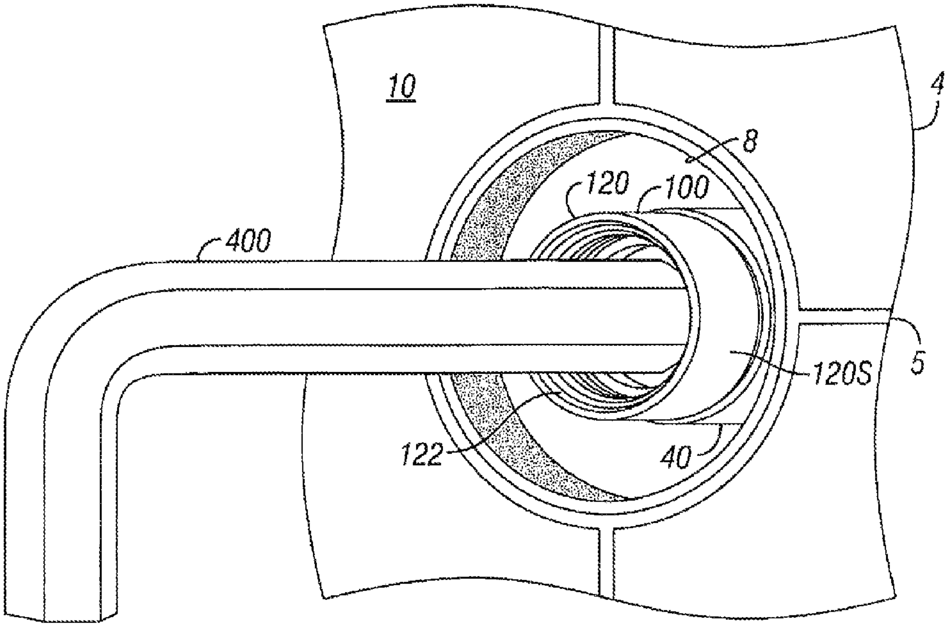
FIG. 9 is a diagrammatic perspective view of the front of the fitting of the invention with a tool engaging a hidden tool-hole.

There are times, however, when the flow restrictor assembly 60 must be removed by authorized personnel for maintenance or repair of the water line. Accordingly, while it would not be apparent to the ordinary user, the method of removing the flow restrictor assembly 60 is illustrated in FIG. 8. The knowledgeable worker, who understands the fitting, pries the O-ring 300 and flow restrictor disk 200 from the fitting 100, revealing the tool-hole opening 114 which now provides the worker with a surface that can be engaged and rotated for removing the fitting 100. In particular FIG. 9 shows the installer inserting a tool 400 with a shape matching the tool-hole through the bottom section 120, fully through the fitting 100 toward the flat plane on the top section of end of the fitting. The tool 400 is required to engage the tool-hole because there is no other surface available for the tool 400 to engage to provide sufficient leverage to unscrew the fitting 100. In one embodiment, where the opening is hexagonal, the installer uses a hex key wrench 400 (also known as an "ALLEN" key) as illustrated in this non-limiting example. It is understood that because numerous variations in the shape of the opening are possible, that matching a tool head to the opening requires variations in the shape of the tool head. Customized tool heads are well known by those possessing ordinary skill in the field of the invention and are beyond the scope of this discussion.

Figure 10:
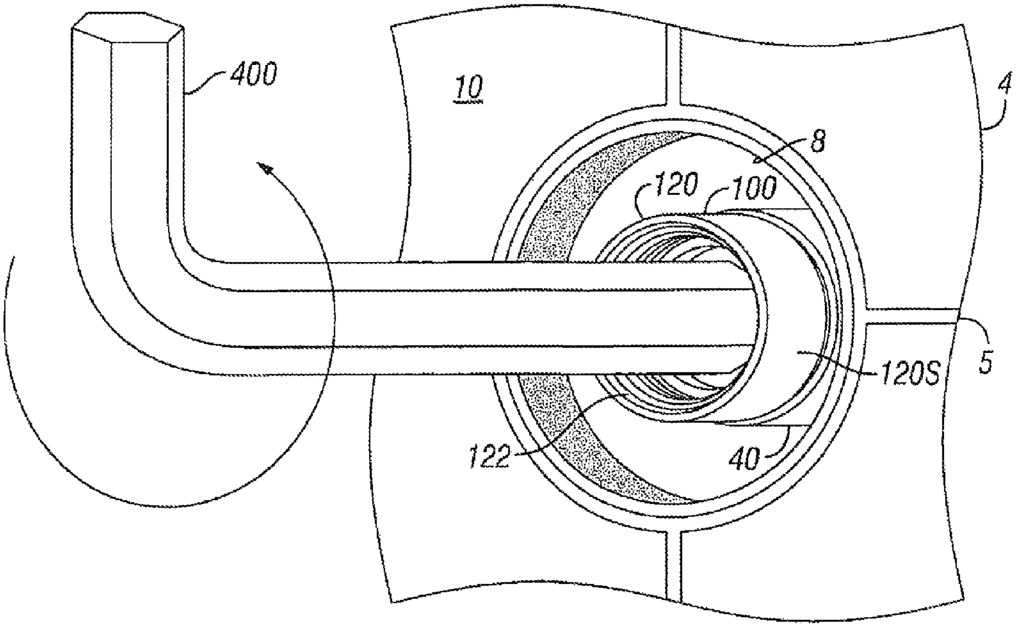
FIG. 10 is a diagrammatic perspective view of the front of the fitting, similar to FIG. 9, showing the tool rotating the fitting for removal.
Figure 11:
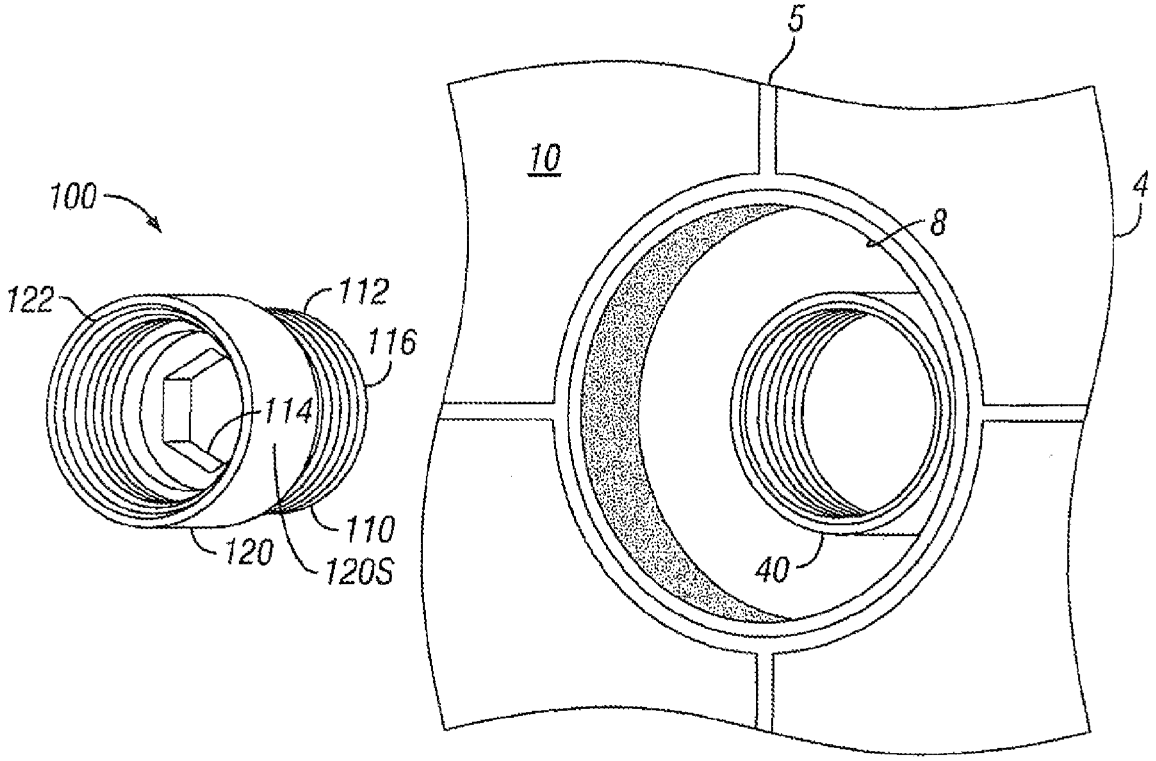
FIG. 11 is a diagrammatic perspective view of the front of a water line with the fitting removed.

FIG. 10 shows the worker rotating the tool 400 to loosen the thread of the fitting by rotating the tool in a counterclockwise motion. It should be noted that this drawing, as well as others drawings here presented assume right-handed thread that tightens by rotating in a clockwise movement and loosens by rotating in a counterclockwise movement. However, it is understood that these are non-limiting examples and that a fitting constructed with left handed thread that tightens or loosens in the opposite manner is still possible while adhering to the inventive concept. FIG. 11 now shows the fitting having been successfully removed from the elbow 40.

In summary, referring back to FIG. 6C, the system prevents tampering with the flow restrictor assembly 60 by multiple means of concealment. Placement of the flow restrictor assembly 60 on the second end 30E of the showerhead arm 30 and in the cavity 2 behind the wall 10 and cover plate 6 protects the flow restrictor assembly 60 from casual observation by the user. When conventional flow restrictors are placed outside the wall, it is easy for even a relatively unskilled user to realize how to liberate the reduced shower water pressure. Here, the installation of the flow restrictor assembly 60 within the wall, in itself will reduce tampering. Also, it should be noted that while the flow restrictor assembly 60 is installed by first connecting to the showerhead arm 30, disconnecting the showerhead arm 30 does not disconnect the flow restrictor assembly 60 from the elbow 40. By positioning the tool-hole on the top section, which when installed is away from opening in the wall 8 and hidden from the user behind the flow restrictor and O-ring, as demonstrated in FIG.

7 and FIG. 8, the system requires a knowledgeable worker familiar with the system to know how to remove the flow restrictor assembly 60. To the user without this knowledge, upon removing the showerhead arm 30 and even the cover plate 6, only the O-ring 300 and flow restrictor 200 are presented. The fitting, as seen by the user, is free of flat surfaces that can be engaged with by a tool. Accordingly, the user, without the understanding of the knowledgeable worker, is prevented from tampering with and disconnecting the flow restrictor assembly 60.

In conclusion, herein is presented a system and method for installing and removing, while preventing tampering, a flow restrictor assembly attached to a showerhead. The system restricts water flow to a showerhead and prevents tampering by concealing the method of removal of the flow restrictor assembly as well as the flow restrictor assembly itself. The invention is illustrated by example in the drawing figures, and throughout the written description. It should be understood that numerous variations are possible, while adhering to the inventive concept. Such variations are contemplated as being a part of the present invention.

What is claimed is:

1. A method of installing a flow restrictor assembly for restricting water flow to a showerhead comprising the steps of:

removing a shower arm from a water supply line, said shower arm having a proximate end and a distal end, said distal end being attached to said showerhead;

providing a flow restrictor assembly, said flow restrictor assembly comprising a fitting and a flow restrictor disk positioned in the interior of said fitting; and installing said flow restrictor assembly directly between said proximate end of said shower arm and said water supply line behind a wall;

wherein when said water flows from said water supply line into said fitting, said water flows through said restrictor disk disposed within said fitting and to said shower arm; and wherein said fitting comprises a tool-hole opening forming a surface adapted to be engaged by a tool for removing said fitting from said water supply line.

2. The method of claim 1 comprising the step of attaching said flow restrictor assembly to said proximate end of said shower arm before said installing step.

3. The method of claim 1 further comprising the step of concealing the proximate end of the shower arm behind a cover plate after said installing step.

4. A method of installing a flow restrictor assembly for restricting water flow to a showerhead comprising the steps of:

removing a shower arm from a water supply line, said shower arm having a proximate end and a distal end, said distal end being attached to said showerhead;

providing a flow restrictor assembly, said flow restrictor assembly comprising a fitting and a flow restrictor disk positioned in the interior of said fitting;

installing said flow restrictor assembly directly between said proximate end of said shower arm and said water supply line behind a wall;

wherein when said water flows from said water supply line into said fitting, said water flows through said restrictor disk disposed within said fitting and to said shower arm removing said fitting from said water supply line, wherein said fitting comprises a tool-hole opening forming a surface adapted to be engaged by a tool for removing said fitting from said water supply line.

5. The method of claim 4, further comprising the step of removing said restrictor disk from said fitting prior to removing said fitting from said water supply line.

6. A method of installing a flow restrictor assembly for restricting water flow to a showerhead comprising the steps of:

removing a shower arm from a water supply line, said shower arm having a proximate end and a distal end, said distal end being attached to said showerhead;

providing a flow restrictor assembly, said flow restrictor assembly comprising a fitting and a flow restrictor disk positioned in the interior of said fitting;

attaching one end of said flow restrictor assembly to said proximate end of said shower arm;

installing said flow restrictor assembly between said proximate end of said shower arm and said water supply line, directly to said water supply line behind a wall; and concealing the proximate end of the shower arm behind a cover plate;

wherein when said water flows from said water supply line into said fitting, said water flows through said restrictor disk disposed within said fitting; and wherein said fitting comprises a tool-hole opening forming a surface adapted to be engaged by a tool for removing said fitting from said water supply line.

7. The method of claim 6, wherein said fitting has a bottom section without a flat edge for being engaged by a tool.

8. The method of claim 6, wherein the flow restrictor assembly has a flow restrictor disk that partially covers the tool-hole opening, thereby concealing the mechanism of removing the flow restrictor assembly.

9. A flow restrictor assembly for restricting water flow comprising:

a fitting having a top section and a bottom section, said top section having an exterior screw thread and said bottom section having an interior screw thread;

a first opening at a first end of said fitting positioned at said top section;

a flat plane at said first end, said flat plane incorporating a tool-hole in the shape of a polygon;

a second opening at a second end of said fitting positioned at said bottom section, wherein said fitting has a continuous bore for carrying water, said bore being larger at said bottom section than said top section;

a flow restrictor disk; and an O-ring, said flow restrictor disk and said O-ring being positioned inside said fitting against a ridge.

10. The flow restrictor assembly of claim 9, wherein said flow restrictor disk and said O-ring are positioned inside the bottom section of said fitting.

11. The flow restrictor assembly of claim 9, wherein when said flow restrictor disk and said O-ring are positioned inside the bottom section of said fitting once installed, the tool-hole is not visible.

12. The flow restrictor assembly of claim 9, wherein said bottom section does not have a flat edge for being engaged by a tool.

13. A flow restrictor assembly for restricting water flow comprising:

a fitting having a top section and a bottom section, said top section having an exterior screw thread adapted to be connected directly to a water supply line behind a wall, and said bottom section having an interior screw thread adapted to be connected directly to a shower arm;

a first opening at a first end of said fitting positioned at said top section;

a flat plane at said first end, said flat plane incorporating a tool-hole in a polygon shape;

a second opening at a second end of said fitting positioned at said bottom section, wherein said fitting has a continuous bore for carrying water;

a flow restrictor disk; and an O-ring, said flow restrictor disk and said O-ring being positioned inside said fitting against a ridge.

14. The flow restrictor assembly of claim 13, wherein said flow restrictor disk and said O-ring are positioned inside the bottom section of said fitting.

15. The flow restrictor assembly of claim 14, wherein when said flow restrictor disk and said O-ring are positioned inside the bottom section of said fitting once installed, the tool-hole is not visible.

16. The flow restrictor assembly of claim 13, wherein said bottom section does not have a flat edge for being engaged by a tool.

* * * * *